April 23, 1957 P. F. WARNER 2,790,008
PROCESS FOR CONTROLLING ACTIVITY OF COPPER REAGENT SOLUTIONS
Filed July 20, 1954
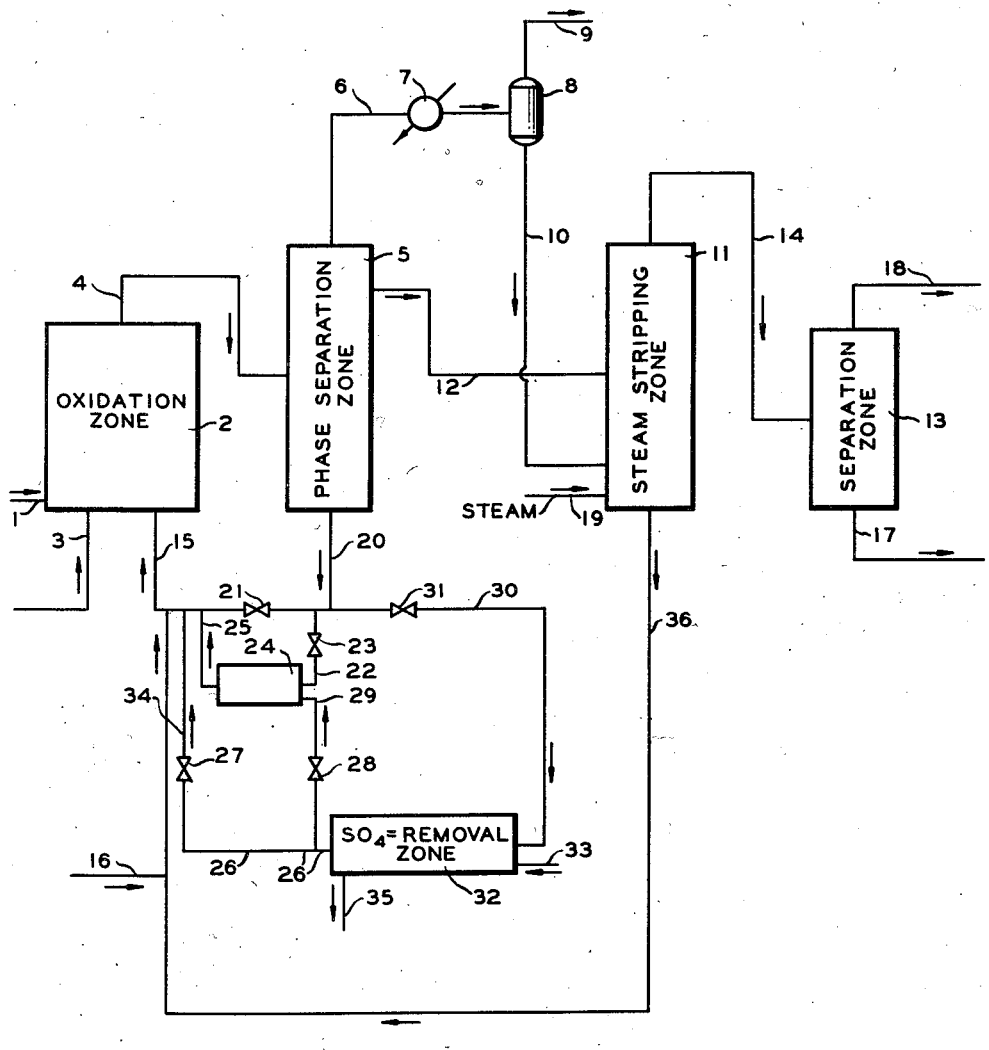
INVENTOR.
P. F. WARNER
BY
Hudson & Young
ATTORNEYS United States Patent Office 2,790,008
Patented Apr. 23, 1957

2,790,008

PROCESS FOR CONTROLLING ACTIVITY OF COPPER REAGENT SOLUTIONS

Paul F. Warner, Phillips, Tex., assignor to Phillips Petroleum Company, a corporation of Delaware Application July 20, 1954, Serial No. 444,482

16 Claims. (Cl. 260—608)

This invention relates to the oxidation of mercapto substituted organic compounds to their corresponding disulfides. In one aspect the invention relates to the oxidation of organic mercaptans to the corresponding disulfide, employing an oxidizing reagent comprising a solution of a cupric halide in an organic solvent containing water. In another aspect the invention relates to maintaining the sulfate ion concentration, in a reagent comprising a solution of a cupric halide in an organic solvent containing water, below a predetermined maximum concentration. In another aspect the invention relates to maintaining the sulfate ion concentration in such a reagent above a predetermined minimum concentration but below a predetermined maximum concentration. In another aspect the invention relates to the removal of sulfate ions from a reagent comprising a solution of a cupric halide in an organic solvent containing water. In still another aspect the invention relates to the removal of sulfate ions from such a solution in order to maintain a high activity of the oxidizing reagent for the oxidation of mercapto-substituted organic compounds. Other aspects, as well as advantages of the invention are apparent from this disclosure, the drawing and the claims.

The well-known liquid reagent copper-sweetening process for oxidizing to disulfides small concentrations of mercaptans contained in hydrocarbons is adaptable to the preparation of disulfides from starting materials containing organic mercaptans in a more highly concentrated state. The principal reactions involved are illustrated in the following equations:

(1) 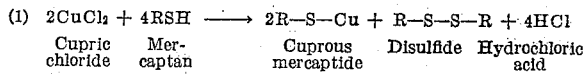

Cupric   Mer-           Cuprous   Disulfide  Hydrochloric
   chloride captan        mercaptide               acid (2) 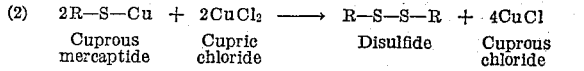

Cuprous    Cupric      Disulfide    Cuprous
   mercaptide  chloride                       chloride In the first step of the reaction (Equation 1) one-half of the mercaptan is converted to the corresponding disulfide and the rest is left as cuprous mercaptide. The latter then reacts (as shown in Equation 2) with additional cupric chloride to give the corresponding disulfide and cuprous chloride. On combining the two equations into one, the ultimate reaction is:

(3) 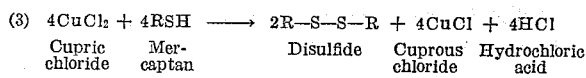

Cupric   Mer-       Disulfide    Cuprous  Hydrochloric
   chloride captan                      chloride     acid Since cuprous chloride and hydrochloric acid are formed in the reaction at the expense of the cupric chloride, the reagent will gradually lose its activity and finally become spent. The reagent is consequently regenerated by oxidation with air or other fluid containing free oxygen. Thus, the cuprous chloride and hydrochloric acid, formed as above shown in the sweetening step, react with oxygen to give cupric chloride and water (as shown in Equation 4):

(4) 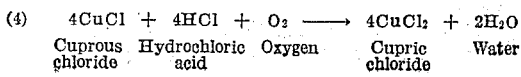

Cuprous  Hydrochloric  Oxygen    Cupric     Water
   chloride     acid                       chloride As described hereafter, in the present process this regeneration may be effected within the reaction zone while the mercaptan oxidation is being carried out therein, or the partially spent reagent may be regenerated in a separate operation by contacting the reagent with an oxygen containing fluid.

When reacting a mercaptan-rich stock to prepare disulfides from mercaptans by oxidation by a direct application of the copper sweetening process to feedstocks containing high concentrations of mercaptans (i. e. stocks containing 50 weight percent or higher, especially those stocks containing 90 percent or more organic mercaptans), cuprous mercaptides are formed in such a concentration that they precipitate from the reaction mixture. As shown by the equations above, for reaction (2) to proceed satisfactorily it is necessary for the cuprous mercaptide to remain dissolved in the reaction mixture in order to provide for the proper contacting of the reactants with the oxidizing agent. Thus, it has been found that it is desirable to employ a reaction medium in which the reactants, including cuprous mercaptide, have a relatively high degree of solubility.

Thus, it has been found that disulfides can be produced in economically significant quantities employing a cupric halide as the oxidant, utilizing a charge stock containing organic mercaptans in any desired concentration. This is accomplished by effecting the oxidation in an organic solvent containing water in which the cupric halide oxidant, the intermediate compounds and the mercaptan reactants are soluble. Examples of such a process are disclosed and claimed in U. S. 2,503,644 to P. Y. Warner and J. A. McBride.

Any organic solvent is useful as long as it meets the foregoing criteria and is not adversely reactive under the oxidizing or the regenerating conditions employed, i. e., the solvent is an organic compound not adversely chemically affected or decomposed under such conditions. Usually the solvent employed is not reactive or chemically affected, i. e., is chemically inert, under the oxidizing and the regenerating conditions. A further requirement is that it must be capable of dissolving water. Solvents containing only carbon, hydrogen, and oxygen are a preferred class.

Very suitable organic solvents for this purpose have been found to be the monoalkyl glycol ethers wherein the alkyl contains preferably not more than 6 to 8 carbon atoms and wherein said glycol is preferably ethylene glycol, diethylene glycol, propylene glycol, dipropylene glycol, or even higher glycols, if desired.

Such a process, utilizing a cupric halide dissolved in an organic solvent containing water, has been proved to be a very efficient and effective method of oxidizing organic mercaptans, and has been commercially and economically employed to produce disulfides from mercaptan feed stocks of 90 percent and higher concentrations. It has been possible to utilize the same copper solution repeatedly, or continuously, for long periods of time, using only regeneration with air to maintain a high level of catalyst activity.

During commercial operation of such a process to produce disulfides, however, it was unexpectedly found that after extended use of the copper reagent it could not be regenerated with air to its original activity; this situation has been found to become progressively worse with continued use, until the reagent must be discarded for economic operation. Although the useful life of the oxidant is such that it is economically discarded, the heretofore unexplained loss in activity of the reagent represents a substantial cost saving which could be made in the process.

I have now found that sulfate ions are formed in the copper solutions described herein, when employed as oxidant in a process such as described in the specification. My invention is based upon the discovery that the presence of an excessive concentration of sulfate ions in the copper solution is responsible for the described lowered activity of the copper halide oxidizing reagent.

According to my invention I maintain the sulfate ions below a specified low maximum concentration in an oxidizing reagent comprising a solution of a cupric halide in an organic solvent containing water.

While this low maximum figure is necessarily dependent upon many factors such as the particular mercapto-compound, the particular solvent, the temperature of treatment, etc., it has been found that generally the maximum concentration of sulfate ions should be below 2.0 weight percent. For instance, when oxidizing tertiary butyl mercaptan and utilizing diethylene glycol monomethyl ether as the organic solvent, it has been found that the reagent activity is sharply reduced as the sulfate ion concentration approaches 1.7 to 1.8 weight percent of the total reagent solution. In any case it is preferable to maintain the concentration of sulfate ions at 1.7 weight percent or lower when the removal of the ion is effected on a purely batchwise basis; but when sulfate ion removal is accomplished continuously or periodically on a small slipstream from the oxidation zone (as described hereafter) the concentration of the sulfate ion is still more preferably maintained at a value below 1.4 weight percent.

It now surprisingly appears that a very smal concentration up to about 1.0 weight percent of sulfate ions is actually beneficial to the activity of the reagent when compared with a reagent solution containing appreciably more or less sulfate ions. Thus, it is often preferable to maintain a sulfate ion concentration of at least about 0.7 weight percent.

According to my invention removal of sulfate ions by any suitable means accomplishes the purpose and desired result of maintaining the reagent activity, and I have found that an especially efficacious method of removal of sulfate ions from a reagent comprising a solution of a copper halide in an organic solvent containing water is by contacting the reagent with a reactant which chemically binds the sulfate ion in a solid form which is insoluble in the said solution. The reagent solution can then be separated from the solid containing the bound sulfate ions. This reactant can suitably be, for example, an anion exchange resin; or a solution (preferably concentrated or saturated) or dispersion, or less desirably a dry powder, of an inorganic salt, the cation of which forms an insoluble precipitate with sulfate ions. Calcium chloride or calcium carbonate in water are especially satisfactory, and the chlorides and carbonates of barium and strontium are also satisfactory. Use of the chlorides also adds necessary chloride ions to the reagent. Because the copper halide reagent contains free HCl, when the carbonates are employed gaseous carbon dioxide is liberated. When employing one of the carbonates mentioned, as the reactant to chemically bind sulfate ions, a slurry of the alkaline earth metal carbonate in water is preferably used since these carbonates have a very limited solubility in water. Another method of removing sulfate ions from the reagent is by salting out. For instance sodium bicarbonate can be added, causing copper sulfates to precipitate. The use of sodium bicarbonate is a decidedly less desirable method because it involves also the removal of valuable copper ions from the solution.

In accordance with the process with which my invention is concerned I utilize a charge stock containing a selected mercaptan in any desired concentration for oxidation to the corresponding disulfide. Mercaptan compounds are considered herein to comprise those having the general formula RSH wherein R is an alkyl, aryl, aralkyl, alkaryl or cyclo-aliphatic radical. Usually, said aryl, aralkyl, alkaryl, and cyclo-aliphatic radicals contain a maximum of 8 carbon atoms and said alkyl radical contains a maximum of 12 carbon atoms. Charge stock is introduced to an oxidation zone containing an oxidizing solution at a maximum temperature of 175° F., preferably in the range of 80–160° F. Oxidizing solutions referred to herein comprise a copper halide dissolved in one or more organic solvents as previously described, such as the glycol ether solvents above mentioned. The oxidizing solution contains cupric ions and halide ions, which halide ions are preferably chloride ions and/or bromide ions (although any of the halides can be used), and although it may comprise an admixture of a soluble cupric chloride, and/or soluble cupric bromide with an organic solvent, e. g., a glycol ether, and water, it is not limited thereto. The oxidizing solution may comprise an admixture of a soluble cupric salt, a soluble chloride and/or bromide salt with the organic solvent and water, the essential element being the presence of cupric ions and chloride and/or bromide ions. Water concentrations in the oxidizing solution, usually in the range of 3 to 20 percent can be utilized, although usually the preferred range is 5 to 10 percent. Higher water concentrations than 20 percent and lower concentrations than 3 percent are within the scope of the claimed invention. For example, an oxidizing solution can comprise cupric chloride dihydrate and a glycol ether solvent with or without additional water, the amount of water present usually not exceeding about 20 weight percent. On the other hand, an oxidizing solution can comprise cupric sulfate, ordinary sodium chloride, water in the preferred concentration of 5 to 10 weight percent, and one of the glycol ether solvents mentioned. When the latter solution is employed, if it initially contains more than the maximum concentration of sulfate ions which has been found to be desirable according to this invention, sulfate ions are preferably removed according to the present invention before initial use of the copper oxidizing reagent in order to obtain an oxidizing reagent having sulfate ions within the preferred limits of the invention. While this procedure entails an extra preliminary step on start-up, it does have the advantage that cupric sulfate and sodium chloride are widely and readily available raw materials.

Conversion of mercaptans to the corresponding disulfide product is substantially instantaneous and complete. Oxidizing solution is usually regenerated (i. e., cuprous halide is oxidized) by passing a stream of air or equivalent oxygen-containing gas through the partially spent solution either in situ or in a regeneration zone external to the oxidation zone. Oxidizing solution and disulfide product are recovered from the effluent of the oxidation zone and the former is recycled to the oxidation zone.

Separation of the disulfide product from the oxidation zone effluent is greatly simplified when solvent employed has, in addition to the requirements previously referred to, only a limited solubility for the disulfide product such that the reaction zone effluent comprises two liquid phases. For instance, when employing diethylene glycol monomethyl ether or ethylene glycol monomethyl ether, two liquid phases form in the oxidation zone, the one rich in disulfide product, and the other rich in oxidizing solution. The disulfide phase has a purity of 90 percent or higher and contains solvent and small amounts of oxidizing reagent as impurities. When employing other solvents, such as for example, monobutyl ether of ethylene glycol, or monobutyl ether of diethylene glycol, a single liquid phase effluent may be obtained. In such cases other known separation means are utilized in the recovery of disulfide product and of oxidizing solution for recycle to the oxidation zone.

The water content is preferably below about 20 percent and above 3 percent of the weight of the total reagent solution. Water in the copper halide-organic reagent solution is, of course, employed because of its function as an intermediate ion carrier, and the choice of the particular value of the concentration within the limits between about 3 to about 20 percent depends largely on the adjustment of the solubility of the reagent solution for an optimum balance between its solubility for the reactants and its solubility for the reaction products produced, keeping in mind that cuprous mercaptide precipitation is to be avoided. This is why there is a maximum concentration of water which can be tolerated in each particular instance. As shown in Equation 4 water is obtained as a by-product of regeneration. Accordingly, by-product water must be removed from the oxidizing solution so as to maintain its concentration in the oxidizing solution in the oxidation zone in a range such that the reagent solution has the desired solvent properties. Complete removal of water from the oxidation zone is undesirable for reasons already discussed. I prefer in most instances to remove regeneration by-product water from the system at such a rate as to maintain a concentration of water in the oxidation zone in the range of 3 to 10 percent by weight of the total oxidizing reagent solution.

The oxidizing solution is necessarily regenerated for the reasons discussed hereinbefore. Oxidizing solution in effluent from the oxidation zone is partially spent to an extent that in most instances the cupric reagent is in a state of about 90 percent reduction. Satisfactory rates of conversion of mercaptans in the oxidation zone can be maintained when regenerating the partially spent oxidizing solution to an oxidized state of about 90 percent. Although a higher state of oxidation can be effected, the presence of some reduced ions is preferred since in such cases there appears to be no evidence of peroxide formation. The rate of regeneration may be controlled by varying the rate at which the oxygen-containing gas flows through the reagent solution. The temperature is preferably kept below 175° F. in order to avoid the formation of insoluble copper compounds which are of no value in the oxidation zone. The extent of regeneration effected can be controlled as a function of the oxidation-reduction potential in the regenerated solution, as measured by a platinum electrode in a saturated KCl-HgCl half cell against the regenerated oxidizing solution. Thus the E. M. F. or potential difference of the half cell oxidizing solution/Pt is measured against the calomel half cell. When the oxidizing solution is completely oxidized the oxidation-reduction potential at 80° F. is 440 mv. and at the state of 50 percent reduction this potential is 395 mv.; at zero potential difference, reduction is complete. The measurement of the oxidation-reduction potential affords a convenient way to control the rate of addition of mercaptan. The sulfate ion concentration must be maintained within a narrow, low range for operation at low oxidation-reduction potential. The optimum oxidation-reduction potential for any given reaction may be readily determined by experiment. Thus, for the oxidation of tert-butyl mercaptan in a process in which the oxidizing solution is regenerated in situ, the preferred oxidation-reduction potential is in the range of 300–325 mv., measured at 80° F.

The removal of excess by-product water of the regeneration can be effected by means of the excess air or other oxygen-containing gas passing through the solution during the regeneration step where a separate regeneration step is employed. The efficiency of the removal of water from the regeneration zone is, of course, dependent upon the required regeneration conditions of temperature and flow of regeneration gas.

When a flow of air 300 percent in excess of the theoretical amount required for regeneration is employed, complete removal of excess by-product water from the oxidizing solution is effected. However, when employing 100 percent excess air flow only about 50 percent of the required removal of by-product water is effected. By-product water can also be removed when a separate regeneration step is employed, with the aid of an introduction of a paraffin hydrocarbon boiling in the range of about 140 to 160° F. to the regeneration system usually in a ratio in the range of 1:1 to 1:3 to the mercaptan oxidized, depending upon the amount of excess air and other particular conditions. For instance normal hexane can be used, and passes overhead with the excess air and by-product water. This latter method of water removal can be employed when the organic solvent employed in the process is one which forms a non-azeotrope mixture with water, e. g., the monomethyl ether of diethylene glycol.

As pointed out hereinabove, when a solvent which results in the formation of two liquid phases in the effluent from the oxidation zone is employed, certain advantages in product recovery are realized. For example, when diethylene glycol monomethyl ether is utilized, a disulfide-rich phase is recovered from the effluent and only a single final purification step is required.

When two liquid phases are recovered from the oxidation zone, the disulfide-rich phase may be purified by conventional means such as water washing and/or fractionation. However, in some instances the specific solvent being utilized forms a non-azeotropic mixture with water and the purification of the disulfide phase can be effected more advantageously by steam distillation. Thus, in the rectification of the system water, diethylene glycol monomethyl ether, and the disulfide product, the water and disulfide are recovered as the overhead product and the solvent is retained as kettle product. A substantially pure disulfide product is obtained upon drying this overhead product.

Depending upon the specific organic mercapto-compound oxidized and the specific solvent utilized various modifications of the process with which my invention is concerned are possible, the essential feature being that the concentration of the sulfate ion in the reagent be maintained below a predetermined value, preferably below about 2.0 weight percent or, more preferably, below 1.7 weight percent. And, as already noted, it is preferred to maintain the sulfate ion concentration above 0.7 weight percent for the reason set forth.

In the description of the accompanying diagrammatic sketch of a presently preferred method of carrying out the process, reference is made to specific feed stocks and operating conditions, both as an aid to clarity in description and as an example of the operation of the invention. In the description of the drawing, valves, pumps, heat exchangers, reflux accumulators, controls and other auxiliary equipment are not shown, although some valves are shown as an aid to discussion and description of the drawing.

Referring now to the drawing, tertiary butyl mercaptan is introduced through line 1 to oxidation zone 2 which contains oxidizing solution comprising diethylene glycol monomethyl ether in which is dissolved cupric chloride dihydrate in a weight ratio to the solvent of 1:5. In this form of the invention oxygen-containing gas, usually air is continuously introduced through line 3 to oxidation zone 2 in a diffused condition to regenerate the copper reagent solution in situ, concomitantly with the mercaptan oxidation reaction. The flow of air also provides the necessary agitation of the reaction mixture, although other forms of agitation can in addition be used if desired, such as a mechanical agitation, or a countercurrent contact of feed stock with reagent solution in a packed tower. The temperature in the oxidation zone is preferably within the range of 120° F. to 160° F., and the conversion is substantially complete in the oxidation zone. The flow of air is regulated in accordance with the requirements of the reagent regeneration, in this case usually in the range from 15 to 25 cubic feet (60° F., 13.5 p. s. i. a.) per pound of tertiary butyl mercaptan per hour. Reactor effluent comprising product disulfide, reagent solution and regeneration off gas is continuously withdrawn through line 4 to phase separation zone 5 wherein air separates from the liquid and the two liquid phases separate. The upper liquid phase is rich in ditertiary butyl disulfide product and has a purity of over 90 percent. The lower, heavier liquid phase is oxidizing reagent solution carried over from the oxidation zone. The off gas withdrawn through line 6 carries off excess by-product water along with small concentrations of diethylene glycol monomethyl ether solvent and disulfide products. The off gas is cooled in heat exchanger 7 and knock-out drum 8 and passes to the atmosphere through line 9. Water and small amounts of solvent and disulfide product collected in drum 8 are passed through line 10 into the bottom portion of steam stripping distillation zone 11. The disulfide rich product phase from phase separation zone 5 is passed through line 12 to an intermediate point in steam stripping zone 11. The proportion of water entering steam stripping zone 11 from drum 8 is usually not adequate for purification by steam distillation of the disulfide-glycol ether mixture, so supplementary steam is added to steam stripping zone 11 through line 19 when necessary. Overhead from steam stripping zone 11 comprises water and ditertiary butyl disulfide free of diethylene glycol monomethyl ether solvent. The overhead product contains about 68 volume percent water and 32 volume percent ditertiary butyl disulfide product. The overhead product is passed to separation zone 13 through line 14 where the disulfide phase, free of diethylene glycol monomethyl ether solvent, is separated from the water phase. Kettle product in steam stripping zone 11, comprising substantially pure diethylene glycol monomethyl ether solvent, is recycled to oxidation zone 2 through lines 36 and 15. Makeup HCl and/or makeup copper reagent solution is introduced, when required, at a suitable point in the system, as through line 16 into the diethylene glycol monomethyl ether flowing in line 16. The water phase in zone 13 is discarded through line 17, while ditertiary butyl disulfide product is passed through line 18 usually to a drying step, and then to storage.

The oxidizing reagent solution in zone 5 is withdrawn through line 20, and the major portion passed through line 15 to oxidation zone 2, valve 21 being open. When insufficient water is eliminated from the oxidizing reagent by being carried out in the off gas through line 6, a supplementary water removal step is effected at a suitable point. For example, part or all of the solution flowing in line 15 can be passed through line 22 and valve 23 to water removal zone 24, and after reduction of the water concentration is effected, through line 25 back to a downstream point in line 15. Water reduction in zone 24 can suitably be effected by a conventional distillation step. An alternate point at which excess water can be removed is by diverting the stream flowing through line 26 through the water removal zone 24 by blocking valve 27 and opening valve 28 in line 29.

In order to maintain the concentration of sulfate ions in the oxidizing reagent within the predetermined limits prescribed according to my invention, a slipstream of the solution flowing in line 20 is diverted periodically or continuously through line 30, valve 31 being opened, to sulfate ion removal zone 32, and after treatment therein is passed through line 26, valve 27, and line 34 to line 15; or alternately, as hereinbefore described, through line 26, and line 29 to zone 24, valve 28 being opened. In zone 32 sulfate ions are removed by any suitable means as hereinbefore mentioned, the degree of removal being sufficient to keep the concentration of sulfate ions in the main body of the oxidizing reagent in oxidation zone 2 within the desired limits. The concentration of sulfate ions in the oxidation solution can be determined by standard methods of quantitative anaylsis. In the embodiment employing an inorganic salt reactant, as described hereinbefore, a saturated or nearly saturated solution, or dispersion, of a suitable inorganic salt reactant, such as calcium chloride dissolved in water, is added through line 33 to zone 32 to the oxidizing reagent solution containing sulfate ions and mixed with the reagent solution. The mixing is merely by addition of the calcium chloride solution to the line in which the oxidizing reagent solution is flowing, or the mixing is in an orifice mixer in the line, or in a centrifugal pump, an agitated or stirred vessel, or by any other suitable means. The resulting calcium sulfate solid which is formed is separated in zone 32 from the oxidizing reagent solution by any conventional means such as a filter, and removed from zone 32 through line 35.

When employing a solution or slurry of an inorganic salt reactant in the manner described it is desirable to avoid over-treatment, i. e., not more than a stoichiometric ratio of the salt such as calcium chloride to the sulfate ions contained in the oxidizing reagent solution should be added. This is to avoid leaving any substantial concentration of cations in the oxidizing reagent solution, which would precipitate with sulfate ions as they are formed in the reagent solution, with consequent settling out of solid sulfate, e. g., calcium sulfate, in equipment and lines downstream from zone 2. However, though distinctly less desirable, the inorganic reactant such as calcium chloride can be added directly to the oxidation zone; and a suitable solid removal step, accomplished by suitable means such as a filter, can be effected on effluent from the oxidation zone. As stated, this is a distinctly less desirable method, but of course makes the use of zone 32 unnecessary.

Specific examples of other inorganic salts reactants which can be used in the foregoing embodiments of the described process in place of calcium chloride are those salts hereinbefore mentioned, viz., calcium carbonate, and barium and strontium chlorides and carbonates.

An alternate method of maintaining the sulfate ion concentration within desired limits in the copper reagent solution is by passing the reagent solution through a suitable solid anion exchange resin reactant, under conditions wherein sulfate ions are chemically bound by the resin. The methods of using anion exchange resins are well known. Commonly the resin is washed with an acid, preferably in this invention the acid of the same halide employed in the copper halide oxidizing reagent, e. g., hydrochloric acid or hydrobromic acid as the case may be. The resin is then washed with water, and drained; then the copper halide reagent containing sulfate ions is passed through the anion exchange resin bed. When the resin bed has become so saturated with sulfate ions as to be ineffective for removing sulfate ions to the desired extent, flow of copper halide reagent through the resin bed is discontinued, and the resin is again washed with acid and water as before.

Another advantage of my invention in its now preferred embodiments is that sulfate ions are prevented from precipitating as copper sulfate, which effect occurs under some conditions at higher concentrations than allowed according to the invention. The precipitate contains copper chloride in addition to copper sulfate and therefore removes an appreciable amount of valuable catalyst from the system.

In a specific example of the invention, a 900 lb. charge of reagent solution is used to oxidize tert-butyl mercaptan. Sulfate ion concentration builds up until the rate of oxidation falls from an initial value of 65 lbs./hr. to only 40 lbs./hr. of tert-butyl disulfide when the solution contains about 1.6 wt. percent sulfate ions. The solution is removed from service and treated in the following manner. A solution containing 7.5 lbs. of calcium chloride and 15 lbs. of water is added to 900 lbs. of the reagent solution. The mixture is then agitated with air for about 5 hrs. in an open vessel. The air is introduced through a plurality of diffusion tubes placed near the bottom of the vessel. The solution is initially at about 135° F. and at the end of the agitation period is about 60° F. due to direct contact with air at this same temperature. After the air is discontinued, vacuum is applied to the diffusion tubes and the liquid is withdrawn therethrough and collected in a suitable vessel. About 9.2 lbs. of solid calcium sulfate is deposited in the bottom of the regeneration vessel. The resulting solution has a sulfate ion concentration of about 0.1 wt. percent. The regenerated solution is then charged to the mercaptan oxidation process and the 900 lbs. of reagent solution then produces disulfide at the rate of 65 lbs./hr.

In the terms oxygen-containing fluid and oxygen-containing gas as used herein and in the claims, the word oxygen has its commonly accepted meaning, namely, free or uncombined oxygen.

Various modifications of this invention will be apparent to those skilled in the art upon study of the accompanying disclosure and the drawing. Such modifications are believed to be within the spirit and scope of this invention.

I claim:

1. In a process for oxidizing a mercaptan to a corresponding disulfide in the presence of an oxidizing reagent comprising a solution of a copper halide in an organic solvent containing 3 to 20 weight percent water, the improvement comprising maintaining the sulfate ion concentration of said oxidizing reagent at a sulfate ion concentration between 0.7 and 1.4 weight per cent by removing sulfate ions from said reagent, said organic solvent being capable of dissolving said mercaptan, the intermediate reaction products and the halide, and not being chemically reactive or decomposed under the conditions of oxidizing.

2. In a process which comprises oxidizing a mercapto-substituted organic compound to the corresponding disulfide in the presence of an oxidizing reagent comprising a solution of a cupric halide in an organic solvent containing 3 to 20 weight percent water the improvement comprising maintaining the sulfate ion concentration of the reagent below a predetermined maximum value by removing sulfate ions from said reagent, said organic solvent being capable of dissolving said mercapto-substituted organic compound, the intermediate reaction products and the halide, and not being chemically reactive or decomposed under the conditions of oxidizing.

3. In a process which comprises oxidizing a mercaptan to the corresponding disulfide in the presence of an oxidizing reagent comprising a solution of a cupric halide in an organic solvent together with 3 to 20 weight percent water, regenerating the reagent by contact with a free oxygen-containing fluid, the improvement comprising maintaining the concentration of sulfate ions in said reagent below 2.0 weight percent during the said oxidizing reaction by removing sulfate ions from said reagent, said organic solvent being capable of dissolving said mercaptan, the intermediate reaction products and the halide, and not being chemically reactive or decomposed under the conditions of oxidizing.

4. In a process which comprises oxidizing a mercaptan to the corresponding disulfide in the presence of an oxidizing reagent comprising a solution of a cupric halide in an organic solvent together with 3 to 10 weight percent water, within the temperature range from 80° F. to 175° F., regenerating the reagent by contact with a free oxygen-containing fluid, the improvement comprising maintaining the concentration of sulfate ions in said reagent below 1.7 weight per cent during the said oxidizing reaction, said organic solvent being capable of dissolving said mercaptan, the intermediate reaction products and the halide, and not being chemically reactive or decomposed under the conditions of oxidizing.

5. In a process which comprises oxidizing a mercaptan to the corresponding disulfide in the presence of an oxidizing reagent containing sulfate ions, said reagent comprising a solution of at least one cupric halide selected from the group consisting of cupric chloride and cupric bromide in an organic solvent together with 3 to 20 weight percent of water, and regenerating the reagent with a free oxygen-containing gas; the improvement which comprises removing sulfate ions from the said reagent by contacting the reagent with a reactant which chemically binds the sulfate ion in a solid form which is insoluble in the said solution, said organic solvent being capable of dissolving said mercaptan, the intermediate reaction products and the halide, and not being chemically reactive or decomposed under the conditions of oxidizing.

6. The improvement of claim 5 in which the said reactant is an inorganic salt, the cation of which forms an insoluble precipitate with sulfate ions.

7. The improvement of claim 6 in which the said inorganic salt is selected from the group consisting of the chlorides of the alkaline earth metals and the carbonates of the alkaline earth metals.

8. The improvement of claim 3 in which the said organic solvent contains only carbon, hydrogen and oxygen atoms in the molecule.

9. The improvement of claim 3 in which the solvent is a monoalkyl glycol ether.

10. In a process for producing an alkyl disulfide by the oxidation of an alkyl mercaptan in the presence of an oxidizing reagent comprising a solution of cupric chloride in diethylene glycol monomethyl ether and water, the water being present in the solution in a concentration in the range from 3 to 20 percent by weight, said oxidizing reagent containing sulfate ions, at a temperature in the range from 120° F. to 175° F. while the said oxidizing reagent is being contacted with a free oxygen-containing gas in the said oxidation zone, removing liquid and gaseous effluents from said oxidation zone, separating gaseous effluent from liquid effluent, recovering alkyl disulfide product from liquid effluent, recovering oxidizing solution from liquid effluent, and recycling a portion of the said oxidizing solution to the oxidation zone, the improvement which comprises removing sulfate ions from another portion of the said oxidizing solution by mixing with a calcium chloride solution and separating solid calcium sulfate thereby formed, and recycling the so treated portion of the oxidizing solution to the oxidation zone, and thereby maintaining the concentration of sulfate ions in the oxidizing reagent in the oxidation zone below 2.0 weight percent.

11. The improvement of claim 10 wherein the said alkyl disulfide is tertiary butyl disulfide and the said alkyl mercaptan is tertiary butyl mercaptan, and the concentration of the sulfate ions in the oxidizing reagent is kept below 1.7 weight percent.

12. The improvement of claim 5 wherein the cupric halide is cupric chloride.

13. The improvement of claim 3 wherein the cupric halide is at least one of the halides selected from the group consisting of cupric chloride and cupric bromide.

14. In a process which comprises oxidizing a mercaptan to the corresponding disulfide in the presence of an oxidizing reagent comprising a solution of a cupric halide in an organic solvent together with 3 to 20 weight percent water, regenerating the reagent by contact with a free oxygen-containing fluid, the improvement which comprises maintaining the concentration of sulfate ions in said reagent below a specific maximum value while oxidizing the said mercaptan, said organic solvent being capable of dissolving said mercaptan, the intermediate reaction products and the halide, and not being chemically reactive or decomposed under the conditions of oxidizing.

15. In a process for producing an alkyl disulfide by the oxidation of an alkyl mercaptan in the presence of an oxidizing reagent, said reagent comprising a solution of at least one cupric halide selected from the group consisting of cupric chloride and cupric bromide in a monoalkyl glycol ether containing water, the water being present in the solution in a concentration in the range from 3 to 20 percent by weight, said monoalkyl containing not more than 6 carbon atoms, said oxidizing reagent containing sulfate ions, at a temperature in the range from 120° F. to 175° F. while the said oxidizing reagent is being contacted with a free oxygen-containing gas in the said oxidation zone, removing liquid and gaseous effluents from said oxidation zone, separating gaseous effluent from liquid effluent, recovering alkyl disulfide product from liquid effluent, recovering oxidizing solution from liquid effluent, and recycling a portion of the said oxidizing solution to the oxidation zone; the improvement which comprises removing sulfate ions from another portion of the said oxidizing solution by mixing with a salt selected from the group consisting of the chlorides of the alkaline earth metals and the carbonates of the alkaline earth metals and separating solid alkaline earth metal sulfate thereby formed, and recycling the so treated portion of the oxidizing solution to the oxidation zone, and thereby maintaining the concentration of sulfate ions in the oxidizing reagent in the oxidation zone below 2.0 weight percent.

16. In a process which comprises oxidizing a mercaptan to the corresponding disulfide in the presence of an oxidizing reagent containing sulfate ions, said reagent comprising a solution of at least 1 cupric halide selected from the group consisting of cupric bromide and cupric chloride in an organic solvent selected from the group consisting of a monoalkyl glycol ether wherein said alkyl contains not more than 8 carbon atoms and wherein said glycol is selected from the group consisting of ethylene glycol, diethylene glycol, propylene glycol, and dipropylene glycol, together with 3 to 20 weight percent of water, and regenerating the reagent with oxygen-containing gas; the improvement which comprises maintaining the sulfate ion concentration of said reagent below 2.0 weight percent by contacting said reagent with an inorganic salt, the cation of which forms an insoluble precipitate with sulfate ions.

References Cited in the file of this patent

UNITED STATES PATENTS

| | | |
|---|---|---|
| 744,720 | Colin | Nov. 24, 1903 |
| 1,815,563 | Henderson et al. | July 21, 1931 |
| 2,227,089 | Hopper | Dec. 31, 1940 |
| 2,329,930 | Nebeck | Sept. 21, 1943 |
| 2,390,868 | Brown | Dec. 11, 1945 |
| 2,503,644 | Warner et al. | Apr. 11, 1950 |